United States Patent [19]
Gilliam

[11] Patent Number: 5,452,956
[45] Date of Patent: Sep. 26, 1995

[54] GREY WATER RECIRCULATION SYSTEM WITH ODOR PREVENTION

[76] Inventor: Marvin J. Gilliam, P.O. Box 127, Fairfield, Va. 24435

[21] Appl. No.: 341,832

[22] Filed: Nov. 18, 1994

Related U.S. Application Data

[63] Continuation of Ser. No. 78,358, Jun. 21, 1993, abandoned.

[51] Int. Cl.⁶ .................................................... E03C 1/00
[52] U.S. Cl. ........................... 366/348; 4/665; 210/167; 210/916; 366/137
[58] Field of Search .................................. 4/314, 317, 318, 4/665; 210/85, 86, 90, 94, 97, 138, 167, 194, 195.1, 257.1, 258, 712, 738, 767, 805, 916; 137/563

[56] References Cited

U.S. PATENT DOCUMENTS

| | | | |
|---|---|---|---|
| 2,798,227 | 7/1957 | Boester | 4/317 |
| 3,112,497 | 12/1963 | Call | 4/665 |
| 3,440,669 | 4/1969 | Boester | 4/317 |
| 3,915,857 | 10/1975 | Olson | 210/104 |
| 3,927,425 | 12/1975 | Delaney et al. | 4/314 |
| 3,958,279 | 5/1976 | Bogusz | 4/314 |
| 3,984,877 | 10/1976 | Kirby | 4/314 |
| 4,011,553 | 3/1977 | Delgado-Barris | 4/314 |
| 4,197,597 | 4/1980 | Toms | 4/318 |
| 5,106,493 | 4/1992 | McIntosh | 4/665 |
| 5,144,700 | 9/1992 | Martin | 4/314 |

*Primary Examiner*—Joseph W. Drodge
*Attorney, Agent, or Firm*—Donavon Lee Favre

[57] ABSTRACT

A limited amount of grey water is collected in a storage tank for use in flushing toilets. During use, the grey water in the storage tank is stirred to discharge small particulate solids with the grey water supplied to a toilet. The stirring also prevents the grey water from stratifying and preventing disinfectant from reaching stratified grey water which in the absence of disinfectant and stirring could become stagnant. The stirring action of the grey water also makes the system self cleaning.

4 Claims, 3 Drawing Sheets

GREY WATER RECIRCULATION SYSTEM WITH ODOR PREVENTION

This application is a continuation of application Ser. No. 8/078,358, filed Jun. 21, 1993, now abandoned.

FIELD OF THE INVENTION

The present invention is directed to a method and apparatus for preventing odor buildup in grey water used to flush toilets, and leak detection systems for valves in the flush water lines of toilets.

1. Background of the Invention

Many areas of the country and the world are experiencing severe shortages of fresh potable water. In addition, the cost of building additional sewage facilities is high, in areas where there is sufficient fresh potable water.

In bathroom sinks, baths, and showers, water after use contains soap and material washed from a persons body. With laundry washing machines, water after use contains detergent and dirt. Rain water from gutters contains leaves, twigs and dirt picked up from the roof. Such water is defined herein as "grey water".

2. Description of the Prior Art

U.S. Pat. Nos. 4,115,879 and 4,197,597 of Toms issued 1978 and 1980 respectively disclose a system where the waste lines of lavatory sinks, showers and clothes washing machines are connected to a storage reservoir for accumulation of water therein. This accumulated water is filtered and treated and thereafter used for the operation of water closets of toilets, the storage reservoir providing for the gravitational separation of solids from the water which are periodically flushed from the reservoir into the sewer. U.S. Pat. No. 3,915,857 of Olson (1975) discloses recirculating white (grey) water through a filter until the water is clear then reusing the water.

BRIEF SUMMARY OF THE INVENTION

It has been discovered that it is not necessary to allow solids to separate from grey water prior to the use of grey water to flush toilets. It has been discovered that stirring the solids into the grey water in a reservoir during flushing improves the grey water treatment with a disinfectant, provides a self cleaning action to the grey water storage tank and allows the solids to be flushed away in a flush toilet.

The present invention is directed to a water conservation system utilizing grey water to flush one or more toilets. The system has a drain in selected facilities other than facilities which have as their primary function disposal of human wastes or solids from a garbage disposal. The system has a conduit from the selected facilities to a storage tank and a water pump associated with the storage tank. The pump has an inlet conduit for receiving water from the tank and an outlet conduit for delivering water to the one or more flush toilets. The improvement of the present invention over the prior art is a mixer or stirrer in the tank to suspend solids in the grey water in the tank while the grey water is being delivered to the one or more flush toilets. The mixer or stirrer can be a second outlet conduit on the pump for pumping water back into the tank to stir up the solids, or an impeller or an air bubbler or any other device known in the prior art for stirring or mixing.

In the preferred embodiment the mixer has a second outlet conduit from the pump back to the storage tank whereby discharge from the pump back to the tank causes mixing and suspension of solids while grey water is being pumped to the one or more toilets.

The conventional wisdom is to save all of the grey water (kitchen, washing machine etc). This stores too much and presents a problem with solids, lint or soap suds. Ideally, if 50 gallons of flush water is needed, then save 49 gallons. Even if 60 gallons a day is flushed away the user still save 49 gallons. The present system preferably uses bathroom grey water only.

To prevent odors generated by grey water standing in a tank for a prolonged period it is preferred that less than enough grey water be collected and stored in the storage tank for an average two day supply of grey water to be delivered to the one or more flush toilets. More preferably only sufficient grey water is collected and stored for an average one day supply of grey water to the one or more flush toilets. To be on the safe side an insufficient amount of grey water is collected and stored to supply the one or more flush toilets.

In a second aspect of the present invention, water is conserved by detecting a leak in the valve that supplies water to a bowl of a flush toilet. This second aspect is applicable to the conservation of both fresh water and grey water. In the second aspect, an electrical switch is turned on by a pressure drop in the conduit to one or more toilets. The switch provides current to a light mounted in the same room as a toilet to indicate a leaky valve in a toilet if the light is lit at a time when no attempt is made to flush a toilet. The electrical switch can be the same switch used to activate the grey water pump, when grey water is used as the flushing water.

In a third aspect the leak detection system is audible and is also applicable to flush toilets employing either fresh or grey water. In the third aspect an outlet of a water inlet conduit is positioned above the upper water level in the tank to provide an audible warning that a discharge valve from the tank to the toilet is defective when the tank is filling when no attempt is made to flush the tank type toilet.

The present invention differs from the prior art in that instead of allowing suspended solids to settle, and removing the suspended solids, the practice of the present invention involves mixing to resuspend the originally suspended solids into the grey water and utilizing grey water containing the suspended solids to flush one or more toilets. Another significant advantage of the present invention is the elimination of soapy scum on the grey water tank walls. The recirculation of the grey water in the grey water tank renders the apparatus of the present invention self cleaning. Like the prior art, the method of the present invention is utilized in a system having a drain in selected facilities other than facilities which have as their primary function disposal of human wastes or solids from a garbage disposal. The system has a conduit from the selected facilities to a storage tank and a water pump associated with the storage tank. The pump has an inlet conduit for receiving water from the tank and an outlet conduit for delivering water to the one or more flush toilets.

DESCRIPTION OF THE PREFERRED EMBODIMENTS

Figure 1:
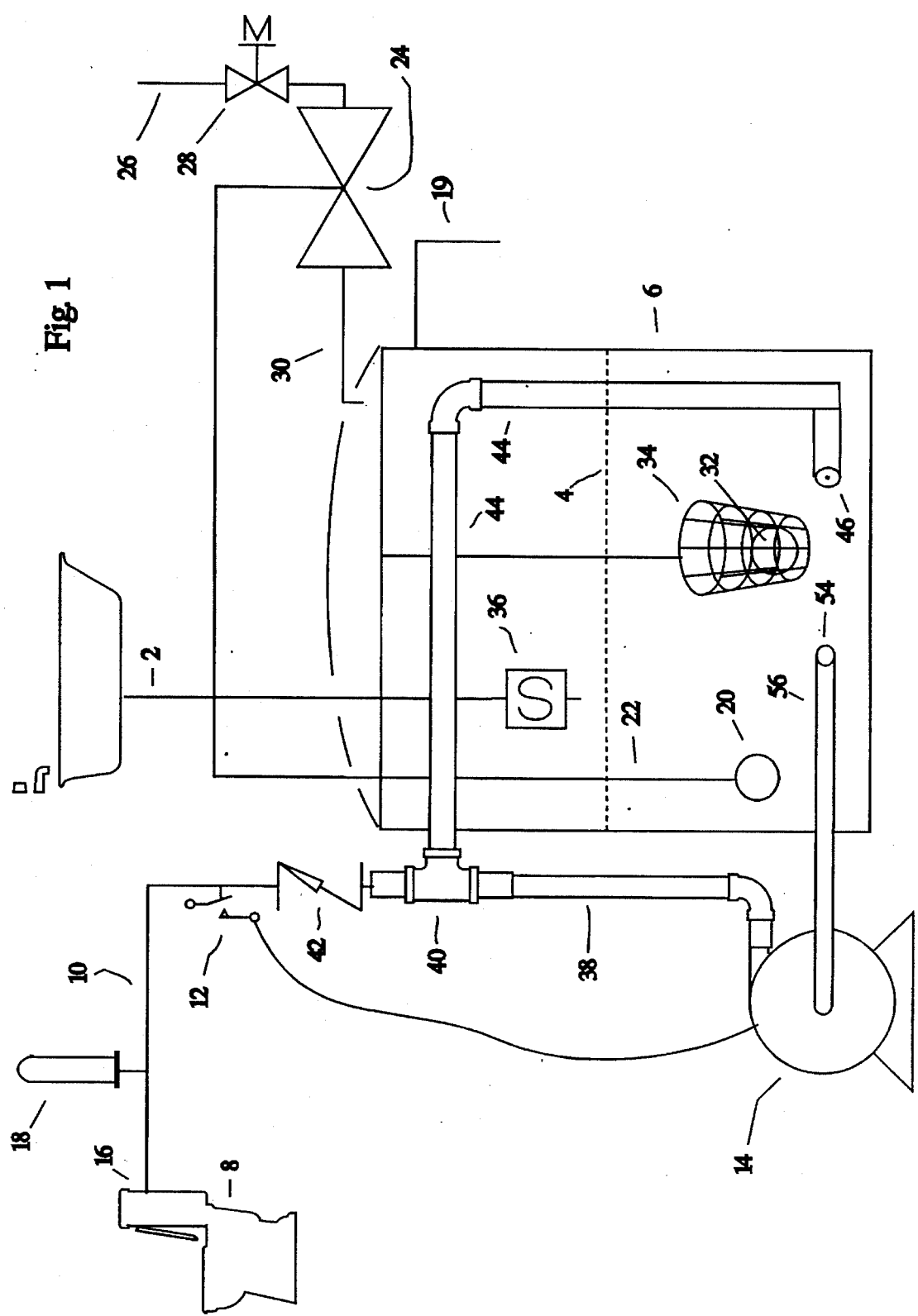
FIG. 1 is view partially in section, and partially schematic of the grey water recirculation system with odor prevention of the present invention.

In FIG. 1, grey water 4 is drained from tub down pipe 2 into a plastic grey water tank 6. There is less odor buildup in a plastic tank than a metal tank. The dotted line shows the upper level of grey water 4. Grey water 4 collects in grey water tank 6 and will be stored until such time as toilet 8 is flushed. When toilet 8 is flushed, the water pressure in water pressure pipe 10 (which goes to the toilet tank) will drop and actuate the pressure switch 12 which will turn on pump 14, pumping grey water 4 from tank 6, through pipe 10 to toilet tank 16. When toilet tank 16 becomes full the float valve in toilet tank 16 will close, the water pressure in pipe 10 will build causing pressure switch to open and shut off pump 14. Air cylinder 18 stabilizes the water pressure so the switch 12 will maintain its pressure range.

Overflow pipe 19 allows grey water 4 to flow from tank 6 to a sewer when tank 6 becomes full of grey water. When grey water 4 is depleted, float 20 will drop, pulling down on rod, opening float valve 24 shown schematically. The clean water comes into float valve 24 through supply pipe 26 to manual shut off valve 28 which is normally open. This process will always provide enough water to flush the toilet. The float valve provide fresh water in water inlet pipe which is always spaced above the upper level of grey water 4 which provides an air gap between clean and grey water.

A commercial toilet cleaning agent 32 in a mesh container 34 suspended in tank 6 is used to eliminate odors what are associated with stored grey water 4 as will be explained below.

A filter 36 is installed at the bottom of the tub drain pipe 2 to catch hair etc, that is associated with bath water.

Odor control is accomplished by volume control (bathroom water only), a toilet cleaning agent and grey water agitation.

Figure 3:
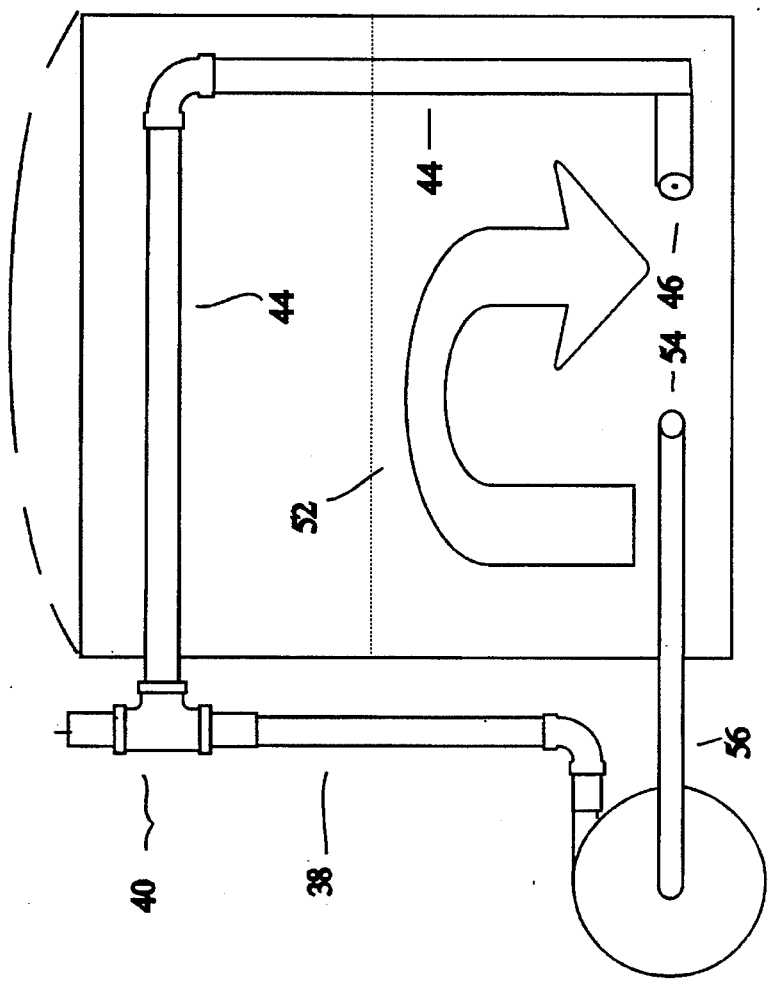
FIG. 3 is a side sectional view of the grey water tank showing the vertical, and horizontal grey water flow pattern.
Figure 2:
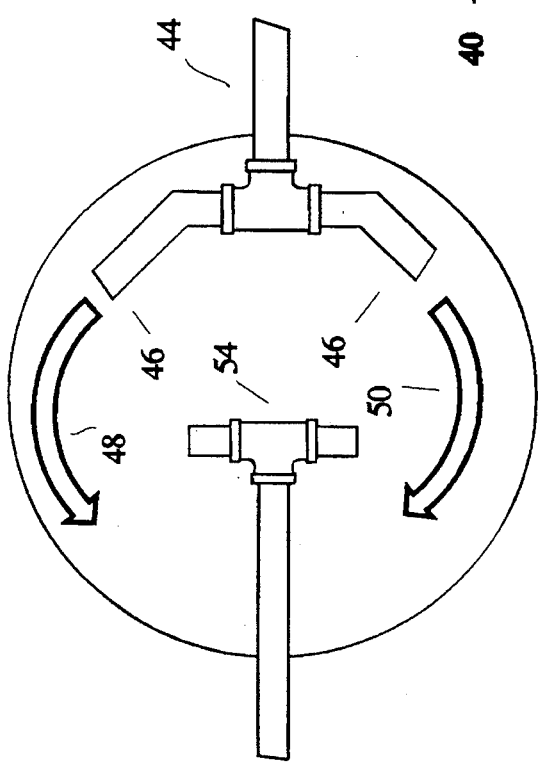
FIG. 2 is a top sectional view of the bottom of the grey water tank showing the horizontal grey water flow pattern.

Grey water agitation, see FIGS. 2 and 3 is accomplished only when the toilet is flushed. Pump 14 pumps grey water up pipe 38 through "T" connection 40, through check valve 42 and water pressure pipe 10 to toilet tank 16. At "T" connection 40 much of the grey water from pump 14 is diverted to recirculation pipe 44 through agitator nozzle 46 causing the recirculated grey water to move in two streams in a circular motion in opposite direction as shown by arrows 48 and 50 until the recirculated grey water streams 48 and 50 meet at the opposite side of tank 6 (see FIG. 2). The two streams 48 and 50 form one stream shown by arrow 52 which rises and moves back down toward the pump suction "T" pipe 54 where the recirculated grey water is drawn into pump inlet pipe 56.

The recirculation prevents solids from settling and remaining in tank 6 for a prolonged period, thus generating odors. The recirculation also prevents the disinfectant released by toilet cleaning agent 32 from stratifying in the grey water and not effectively deodorizing stagnant areas of grey water 4 in tank 6. The recirculation also removes any scum which builds up on the walls of tank 6.

Recirculation pipe 44 is shown inside of tank 6 in FIGS. 1 and 3 and outside of tank 6 in FIG. 2. This was done primarily to show the flow pattern of the recirculated grey water. Pipe 44 can be positioned inside of or outside of tank 6.

Figure 4:
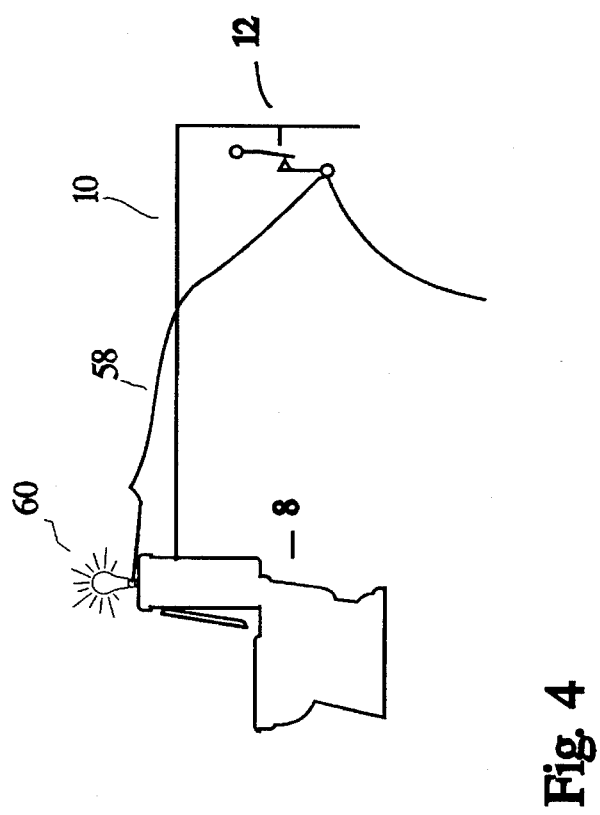
FIG. 4 shows the electrical circuit for a flapper valve leak detecting light that is turned on when water is supplied to a flush toilet.

Turning now to FIG. 4, the visual flapper valve leak detector of the present invention is shown. Pressure switch 12 as explained earlier is closed when the toilet is flushed. An electrical conductor 58 provides current to light 60 when the switch is closed. When the flapper valve in toilet 8 leaks, this also causes a pressure drop in pressure pipe 10 causing pressure switch 12 to close causing light 60 to turn on an indicate water being wasted.

Figure 5:
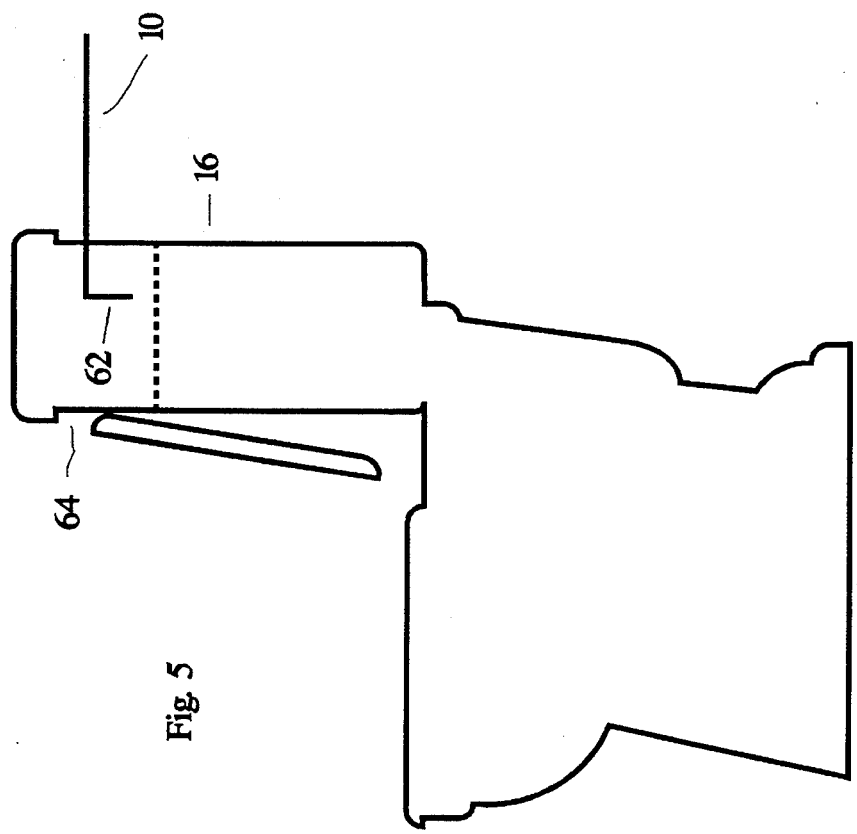
FIG. 5 show an unshielded water inlet above the water level in the flush tank to provide an audible warning of a flapper valve leak.

A similar though audible leak detector is shown in FIG. 5. There pressure pipe 10 discharges through nozzle 62 directly into toilet tank 16 without any acoustic obstruction between the nozzle 62 and the wall 64 of the toilet tank. When one hears the sound of running water in the toilet tank at a time when it is not being flushed, one is aware of the fact that the flapper valve is leaking.

The latest version of the apparatus of FIG. 1 utilized a one half horsepower sump pump as pump 17, one half inch pipe for recirculation pipe 44 and a fifty five gallon plastic tank for grey water tank 6.

What is claimed is:

1. In a water conservation method utilizing grey water containing solids to flush one or more toilets, comprising provided a system having one or more drains in selected facilities other than facilities which have as their primary function disposal of human wastes or solids from a garbage disposal, the system having a conduit from the one or more drains of the selected facilities to a storage tank, a water pump associated with the storage tank, the pump having an inlet conduit for receiving water from the tank and an outlet conduit for delivering water to the one or more flush toilets wherein the improvement comprises mixing the solids into the grey water in the tank to maintain the solids in suspension to facilitate removing the solids with the grey water being delivered to the one or more flush toilets.

2. In a water conservation method for a residential building utilizing grey water containing solids to flush one or more toilets, comprising provided a system having one or more drains in selected facilities other than facilities which have as their primary function disposal of human wastes or solids from a garbage disposal, the system having a conduit from the one or more drains of the selected facilities to a single storage tank, a water pump associated with the storage tank, the pump having an inlet conduit for receiving water only from the single tank and an outlet conduit for delivering water to the one or more flush toilets wherein the improvement comprises collecting and storing less than enough water in the storage tank for an average two day supply of grey water to be delivered to the one or more flush toilets, mixing the grey water in the tank to maintain the solids in suspension to facilitate removing the solids with the grey water being delivered to the one or more flush toilets.

3. The method of claim 2 wherein only sufficient grey water is collected and stored in the tank for an average one day supply of grey water to the one or more flush toilets.

4. The method of claim 2 wherein an insufficient amount of grey water is collected and stored in the tank to supply the one or more flush toilets.

* * * * *